United States Patent
Mestha

Patent Number: 6,157,469
Date of Patent: Dec. 5, 2000

[54] DYNAMIC DEVICE INDEPENDENT IMAGE CORRECTION METHOD AND APPARATUS

[75] Inventor: Lingappa K. Mestha, Fairport, N.Y.

[73] Assignee: Xerox Corporation, Stamford, Conn.

[21] Appl. No.: 09/083,203

[22] Filed: May 22, 1998

[51] Int. Cl.$^7$ .............................. H04N 1/46; G03F 3/08
[52] U.S. Cl. .......................................... 358/504; 358/518
[58] Field of Search ..................... 358/504, 518, 358/520, 523; 382/167, 274

[56] References Cited

U.S. PATENT DOCUMENTS

| | | | |
|---|---|---|---|
| 3,870,968 | 3/1975 | Vosteen et al. | 330/207 P |
| 4,205,257 | 5/1980 | Oguro et al. | 315/39.69 |
| 4,403,866 | 9/1983 | Falcoff et al. | 366/132 |
| 4,724,461 | 2/1988 | Rushing | 315/14 D |
| 4,853,639 | 8/1989 | Vosteen et al. | 324/457 |
| 4,887,217 | 12/1989 | Sherman et al. | 364/468 |
| 5,003,327 | 3/1991 | Theodoulou et al. | 346/154 |
| 5,045,882 | 9/1991 | Roehrs et al. | 355/208 |
| 5,243,383 | 9/1993 | Parisi | 355/208 |
| 5,481,380 | 1/1996 | Bestmann | 358/404 |
| 5,544,258 | 8/1996 | Levien | 382/169 |
| 5,559,173 | 9/1996 | Campo et al. | 523/303 |
| 5,662,044 | 9/1997 | Loffler et al. | 101/492 |
| 5,664,072 | 9/1997 | Ueda et al. | 395/109 |
| 5,708,916 | 1/1998 | Mestha | 399/49 |
| 5,717,978 | 2/1998 | Mestha | 399/46 |
| 5,734,407 | 3/1998 | Yamada et al. | 347/133 |
| 5,748,221 | 5/1998 | Castelli et al. | 347/232 |
| 5,749,019 | 5/1998 | Mestha | 399/46 |
| 5,749,021 | 5/1998 | Mestha | 399/49 |
| 5,754,918 | 5/1998 | Mestha et al. | 399/48 |
| 5,812,903 | 9/1998 | Yamada et al. | 399/42 |
| 5,822,079 | 10/1998 | Okuno et al. | 358/300 |
| 5,884,118 | 3/1999 | Mestha et al. | 399/15 |

FOREIGN PATENT DOCUMENTS 4314768   11/1992   Japan.

OTHER PUBLICATIONS

"Color Technology for Imaging Devices," Henry Kang, pp. 318–327.

"Miniature Lights for Miniature Spectrometers," Ocean Optics, Inc.,

"Sequential Linear Interpolation of Multidimensional Functions," James Z. Chang et al., IEEE Transactions on Image Processing, vol. 6, No. 9, Sep. 1997.

*Primary Examiner*—Kimberly A. Williams
*Attorney, Agent, or Firm*—Oliff & Berridge, PLC

[57] ABSTRACT

A method of controlling color drift between a desired image and an output image as obtained by a marking device and intended to match the desired image includes detecting a current output color in the output image with a color sensing device, determining a difference between the current output color in the output image and a corresponding color in the desired image, and automatically setting a next output color in the output image equal to a corrected color that minimizes the difference between the next output color and the corresponding color in the output image.

28 Claims, 9 Drawing Sheets

6,157,469

DYNAMIC DEVICE INDEPENDENT IMAGE CORRECTION METHOD AND APPARATUS

BACKGROUND OF THE INVENTION

1. Related Applications

The subject matter of the present application is related to the subject matter of the applications entitled "Automatic Colorant Mixing Method and Apparatus" (attorney docket no. 100218) and "Device Independent Color Controller and Method" (attorney docket no. 100214) filed by the same assignee, which are incorporated herein by reference.

2. Field of Invention

The present invention is directed to controlling the colors of an image output by a marking device capable of outputting one or more colors, and in particular, to a method and apparatus for controlling an output color by correcting for color drift, i.e., the variation between the current output color and the same color output under standard conditions.

3. Description of Related Art

Users of color or black and white marking devices, e.g., printers, copiers, etc., increasingly demand highly accurate output. Users have also become accustomed to printers and copiers that produce high quality color and gray-scaled output. Users now expect to be able to reproduce a color image with consistent quality on any compatible marking device, including another device within an organization, a device at home or a device used anywhere else in the world.

Over time, the output of conventional marking devices drifts (or deviates from predetermined optimum standards) due to various factors. These factors include environmental conditions (temperature, relative humidity, etc.), use patterns, the type of media (e.g., different paper types, transparencies, etc.) used, variations in media, variations from original models used in initialization, general wear, etc. When a marking device is originally initialized, and at regular or irregular intervals thereafter, it is calibrated to produce output as close as possible to a reference standard. The calibration process, however, is time consuming and expensive, particularly because specific expertise is required.

As an example, calibration of a conventional four-color (cyan, magenta, yellow and black) printer or copier involves at least the following processes in sequence (see FIG. 3): (1) generating a 3D look-up table for mapping device independent parameter space to CMY (cyan-magenta-yellow) space (step S302); (2) executing a GCR (gray component replacement)/UCR (under color removal) strategy (and possibly gray balancing) to convert the CMY space parameters to CMYK space parameters which represent the colors of a typical four-color marking device (step S304); (3) linearizing marking device TRCs (tone reproduction curves) to account for marking device variabilities (normally done at the time of manufacturing or whenever the printer calibration process is involved)(step S306); and (4) applying a suitable half-toning strategy, with reference to the color rendition dictionary, to convert the CMYK space device independent description to a device specific description (e.g., bits to be received by a raster output scanner or similar device for outputting the image) (step S308). See Henry R. Kang, "Color Technology for Electronic Imaging Devices" ISBN 0-8194-2108-1, SPIE Optical Engineering Press, 1997.

In processing the image, the critical step that accounts for variations in marking device output is TRC linearization. Tone Reproduction Curves are stored plots of an input parameter value versus an output parameter value for a particular color. A TRC is a monitonically increasing marking device function in input-output contone space or input-output density space or input-output byte space, or combinations thereof In other words, a TRC indicates the value of the output parameter for a specific device that must be used to reproduce the input parameter (if the input and output parameters are exactly equal, then the inputs and outputs are expressed in the same coordinate space). Inaccuracies in the TRC linearization step because of infrequent processing lead to inaccuracies in gray balancing and the 3D look-up table. The inaccuracies in the 3D look-up table can also result because the most current marking device information is not considered.

It would be desirable to correct the TRC linearization on a real time basis before that linearization is used to create output. As a result, the output would be accurate and would not vary. It would be especially desireable to provide a real time correction of page to page deviations in output. Updating the TRC linearization would require reprogramming already-programmed marking device drivers, which is difficult. Thus, it would be desireable to correct the output outside the marking engine as opposed to inside the marking engine.

SUMMARY OF THE INVENTION

According to the invention, a method of correcting for and controlling color drift between a desired image and an output image as obtained by a marking device and intended to match the desired image includes detecting a current output color in the output image with a color sensing device, determining a difference between the current output color in the output image and a corresponding color in the desired image and automatically setting a next output color, preferably on a real-time basis, in the output image equal to a corrected color that minimizes the difference between the next output color and the corresponding color in an output image.

The step of determining preferably includes obtaining the output colors of the marking device under standard conditions. Obtaining the output colors preferably includes accessing output color values stored in memory.

The step of setting preferably includes setting the corrected color equal to a sum of a processed difference between the current output color in the output image and the corresponding color in the customer image to an output color of the marking device under standard conditions.

The step of determining the difference preferably includes computing an error signal equal to a difference between the current output color and the output image expressed in parameter space and the corresponding color in the desired image expressed in parameter space.

The step of determining preferably includes calculating a weighted error by multiplying the error signal by a gain matrix. The step of determining preferably includes calculating a color delta amount by integrating the weighted error with respect to an iteration step.

The step of detecting the current output color preferably includes detecting the target color under current conditions with a spectrophotometer from patches of the target color on a medium as obtained on the marking device. The step of setting the next output color preferably occurs before output of the output image is completed.

According to another aspect of the invention, the step of setting is automatically setting a next output color in the output image based on a processed difference between the current output color and the corresponding target color and a desired color of the desired image to minimize the difference between the next output color and the desired color in the output image.

The step of setting preferably includes summing the integrated weighted error and the current color under standard conditions to determine a target color in drift space.

The step of setting preferably includes mapping uncontrolled target colors onto a relationship between target colors under current conditions and the target colors in drift space.

The step of setting preferably includes setting the next output color equal to a target color determined by interpolating between or extrapolating from known values on the relationship between the target colors under current conditions and the target colors in drift space. The step of setting preferably includes mapping uncontrolled target colors onto a relationship between target colors under current conditions and the target colors in a device dependent drift space.

According to the invention, a marking device drift correction system that corrects for drift in an output image intended to match a desired image is also disclosed.

BRIEF DESCRIPTION OF THE DRAWINGS

Preferred embodiments of the invention will be described with reference to the following drawings, wherein like reference numerals refer to like elements, and wherein.

DETAILED DESCRIPTION OF PREFERRED EMBODIMENTS

According to the invention, drift in the output of a marking device, as measured by the difference between current output and output under standard conditions (e.g., at the initial calibration stage), is compensated. As a result, the current output of a marking device matches its output at initial calibration. Further, the output of a first marking device using the invention matches the output of a second marking device using the invention, despite differences between the output of the first and second marking devices that would be apparent without the invention.

According to a first embodiment, a desired color in drift space is output to the marking device. The desired color in drift space is the input desired color, corrected in accordance with stable feedback control algorithms by an amount by which the desired color under standard conditions differs from desired color under current conditions. In the first embodiment, reference values for the desired color under standard conditions are equal to the desired color. The first embodiment requires monitoring every possible color for every pixel, which is difficult to achieve for all situations with the current technology.

Figure 1:
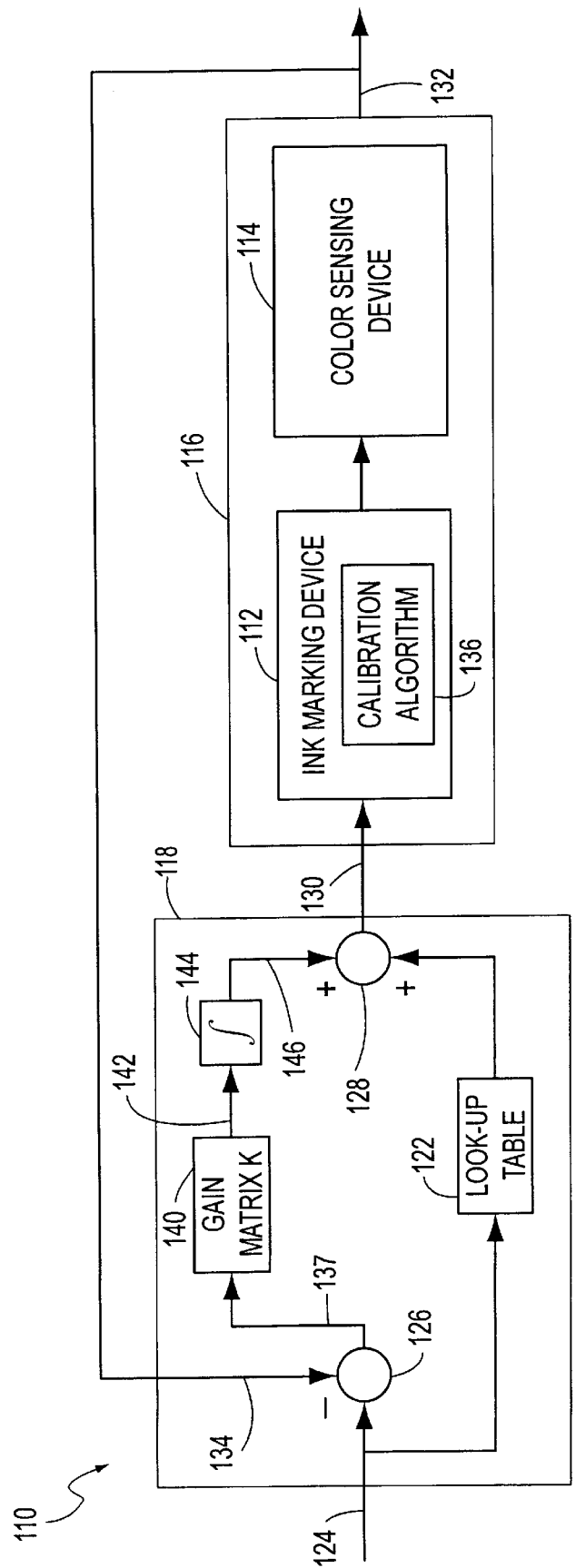
FIG. 1 is a diagram showing the structure of and functions performed by a first embodiment of a marking device with device independent image correction.

FIG. 1 shows a marking device system 110 with device independent image correction according to a first embodiment of the present invention. The system 110 includes a marking device 112, which may be a printer, copier or other similar marking device. The marking device 112 is connected to a color sensing device 114 that detects an output color on a medium processed by the marking device 112. For the purposes of control of the output color of the marking device as discussed below, the marking device 112 and the color sensing device 114 are together regarded as the "plant" 116. The detected output color is output as an output color signal 132 from the plant 116.

In preferred embodiments, the color sensing device 114 is a spectrophotometer. The spectrophotometer develops a relationship between the intensity and the wavelength of the detected color. The spectrophotometers produced by Micro Parts (Germany), and Ocean Optics are potentially suitable for marking device applications. Other color sensing devices, e.g., a calorimeter, may also be configured for use as the color sensing device 114 in this application.

The plant 116 is linked with a color controller 118. The color controller 118 receives an input 124, which, in the first embodiment, is the desired image to be output by the marking device specified in device independent parameter space. In a preferred embodiment, the image is specified in trichometric device independent parameter space L*, a*, b* coordinates. Alternatively, other standard trichometric representations of color, such as XYZ coordinates, may be used.

Within the color controller 118, the input 124 representing the desired image is fed to a look-up table 122, which is described in greater detail below. At a first summing node 126, the input 124 is summed with the output color signal 134, which is fed back from the plant 116 to the color controller 118 and represents the current output color being output. The output of the first summing node 126, which is an error signal representing the difference between the desired color and the output color, is fed as an output 137 to a gain matrix K 140. The output of the gain matrix 140, which is the weighted error u, is fed as an output 142 to an integrator 144. The integrator 144 integrates the weighted error u and outputs corrections to the values output from the look-up table 122 in drift space at an output 146.

Assuming k as the iteration step (e.g., number of prints), the equations solved by the integrator 144 and the gain matrix 140 are, respectively:

$V(k)=V(k-1)+u(k)$ $u(k)=KE(k)$ where $$E(k)=[L*_1{}^t-L*_1{}^m a*_1{}^t-a*_1{}^m b*_1{}^t-b*_1{}^m \ldots L*_N{}^t-L*_N{}^m a*_N{}^t-a*_N{}^m b*_N{}^t-b*_N{}^t$$

K is a matrix of dimensions N×N $L*_1, a*_1, b*_1 \ldots L*_N, a*_N, b*_N$ are the L*,a*,b* values of each patch V(k) is a function of the delta for L*,a*, and b* values t indicates target values and m indicates measured values The matrix K is predetermined from a first set of input-output experimental data on the marking device and is stored in memory, similar to the look-up table 122.

The output 146 and an output from the look-up table 122 are summed at a second summing node 128, thus correcting the color that would be produced under standard conditions by the amount of drift in the marking device output. The output from the second summing node 128, which are the corrected device independent parameter values in drift space corresponding to the desired image compensated for the drift, are the output 130 of the color controller 118 that is fed to the plant 116.

The look-up table 122 is created by modeling the inverse of the plant 116 at standard conditions. One way of designing the look-up table is by printing and measuring color patches which are described in device independent parameters under standard conditions. The number of patches is chosen to equal as many colors as are required to be controlled in the system. Other methods are by modeling the inverse using full/partial factorial design of experiments and, suitably, by interpolating colors to cover the control of all of the colors of interest to the customer. The particular values for the plant inverse are determined by initializing the system through processing predetermined color patches having known parameters (i.e., known device independent colorimetric values) and by obtaining the detected device independent colorimetric values. The number of color patches to be processed, e.g., fifty, is a representation of the color which the marking device is expected to output. Depending upon the particular system, modeling every possible color combination may be difficult or too expensive. Therefore, the plant inverse may be created from a representative sampling of these fifty colors, with the colors not corresponding to the sampled colors being achieved by interpolation and extrapolation.

Figure 3:
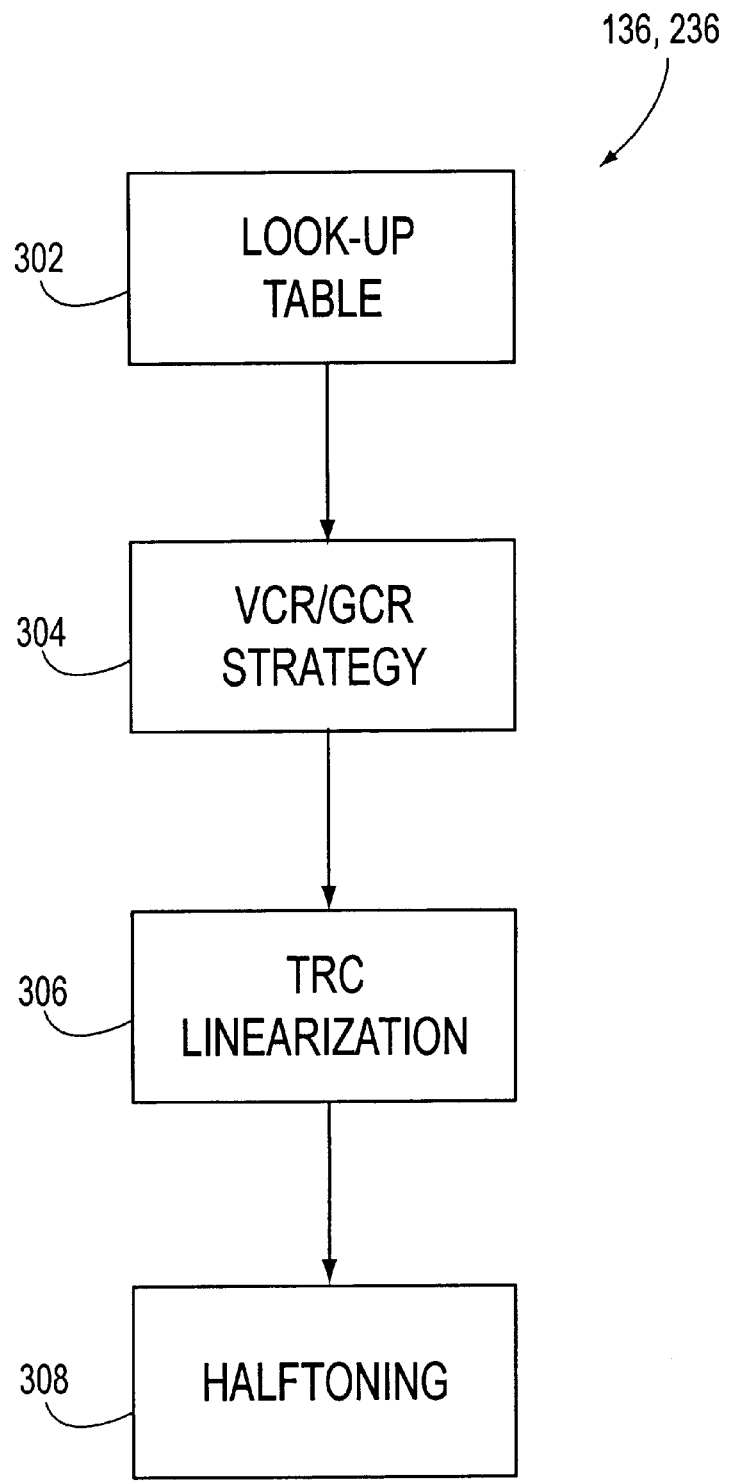
FIG. 3 is a flow chart showing the steps performed in a conventional marking device calibration.

The marking device is linked with a calibration algorithm 136. As stated in the background section, several important steps of a conventional calibration algorithm are shown in FIG. 3. The calibration algorithm 136 uses a 3D look-up table 302 to map device independent space parameter values to CMY space. In addition, the calibration algorithm 136 uses a UCR/GCR strategy to convert CMY space to CMYK space. Further, a TRC linearization 306 and a half-toning scheme 308 are included in the calibration algorithm 136. Standard calibration are discussed in Kang, "Color Technology for Electronic Imaging Devices."

Figure 2A:
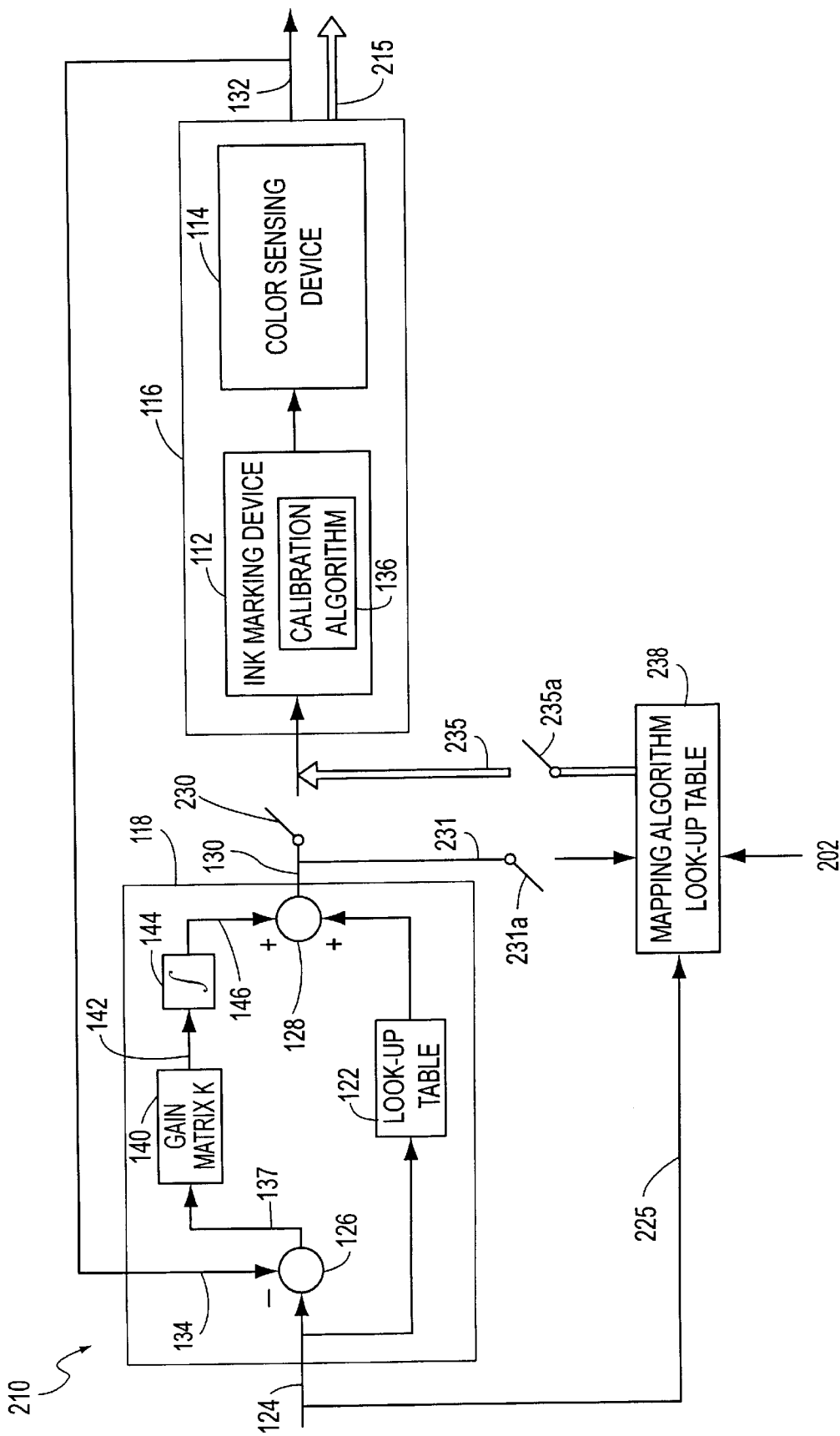
FIG. 2A is a diagram showing the structure of and functions performed by a second embodiment of a marking device with device independent image correction.

Referring to FIG. 2A, a second embodiment of a marking device system designed to achieve device independent color correction is shown. In the marking device system 210 of the second embodiment, and in contrast to the first embodiment, the output under standard conditions for each color in the gamut of the marking device 112 is not measured. Rather, the output under standard conditions is measured for only some representative sampling of colors within the gamut. The colors for which the output under standard conditions is measured are the target colors in the second embodiment. Target colors are chosen using methods disclosed in Chang, J. Z., Allebach, J. P., Bouman, C. A.; "Sequential Linear Interpolation of Multi-Dimensional Functions," IEEE Transcript on Image Processing, Vol. 6, No. 9, September. 1997, or by way of experimentation and off-line processing under standard conditions. However, control of drift in a desired image containing colors other than the target colors is still achieved.

In the second embodiment, any drift in the target colors is first corrected. The target colors are input to the color controller 118 at the input 124, processed by the color controller 118 and output by the color 118 at the output 130 to the marking device 112. The output target colors under current conditions are then measured by the color sensing device 114.

The measured target colors under current conditions are fed back to the color controller 118. At the first summing node 126, the error signal, which is the difference between the measured target colors under current conditions and the target colors (i.e., the same colors at standard conditions), is calculated. The error signal is multiplied by the gain matrix K 140 to determine the weighted error u, and the weighted error u integrated by the integrator 144.

The output 146 of the integrator 144 is summed at the second summing node 128 with the values from the look-up table 122 to determine the target color in drift space. The target color values in drift space are input to the plant 116 at the output 130. A switch 230, which can interrupt the output 230 in its open position, as shown in FIG. 2A, is closed during correction of drift in the target colors. The feedback and processing described above continues until convergence is reached, i.e., until the difference between the measured target colors at current conditions and the target colors is within a predetermined acceptable range, which occurs within only a few iterations. The desired convergence rate (number of iteration steps) may be controlled by suitably choosing the gain matrix K.

Subsequently, once the output of the plant 116 is controlled for the target colors, steps are taken to account for drift of colors in the desired image that are different from the target colors. According to one method, a mapping algorithm look-up table 238 is constructed. The mapping algorithm look-up table 238 is the dynamic inverse of the plant 116 because it is constructed from the most current target colors in a drift space, as is described below.

After convergence is reached, a switch 231a is closed to allow the target color values in drift space to be fed to the look-up table 238. The look-up table 238 also receives the target color values (in device independent space) via an input 225.

Figure 5:
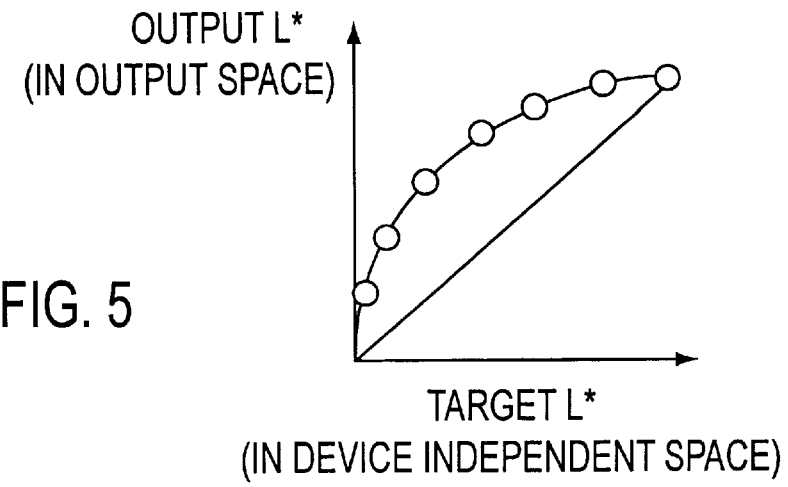
FIG. 5 is a graph showing a conceptual relationship of target L* values versus output L* values for fixed a* and b* values.
Figure 6:
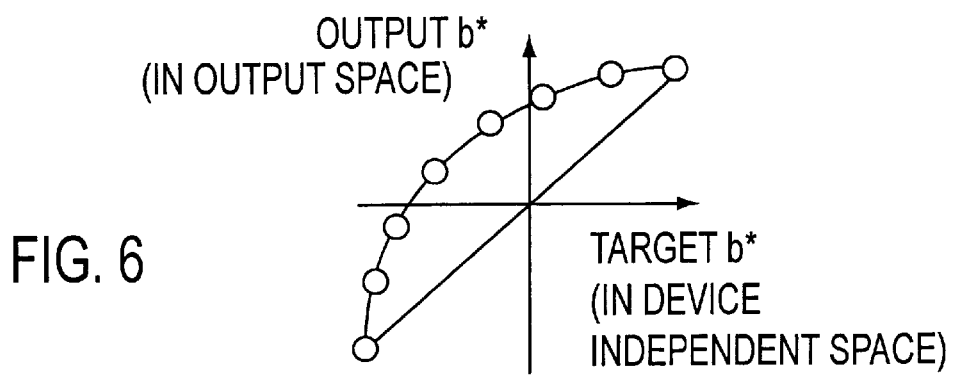
FIG. 6 is a graph showing a conceptual relationship of target a* values versus output a* values for fixed L* and b* values.
Figure 7:
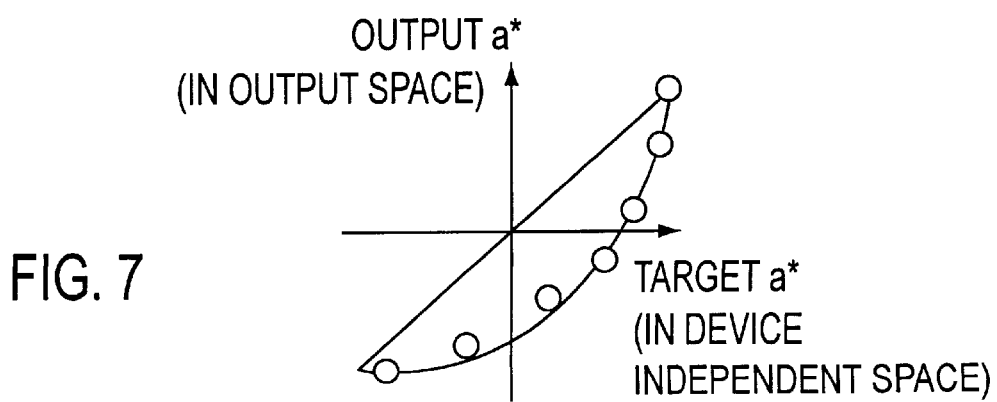
FIG. 7 is a graph showing a conceptual relationship of target b* values versus output b* values for fixed L* and a* values.

A relationship between the target colors in device independent space and the target colors in drift space is established. FIGS. 5, 6 and 7 are conceptual examples of such relationships. FIG. 5 is a conceptual relationship of target color L* values in device independent space versus output color L* values in output space (for fixed target color a* and b* values). FIG. 6 is a conceptual relationship of target color b* values in device independent space versus output color b* values in output space (for fixed target color L* and a* values). FIG. 7 is a conceptual relationship of target color a* values in device independent space versus output color a* values in output space (for fixed target color L* and b* values). The indicated points (i.e., the open circles) on the relationships shown in FIGS. 5, 6 and 7 represent the output colors characteristics, i.e., the output L*, b* and a* values, respectively, for the output colors corresponding to the within gamut target colors at standard conditions and the within gamut target colors in drift space. The 45° lines in FIGS. 5, 6 and 7 correspond to the colorimetrically matched surfaces in one-dimensional space.

Figure 8:
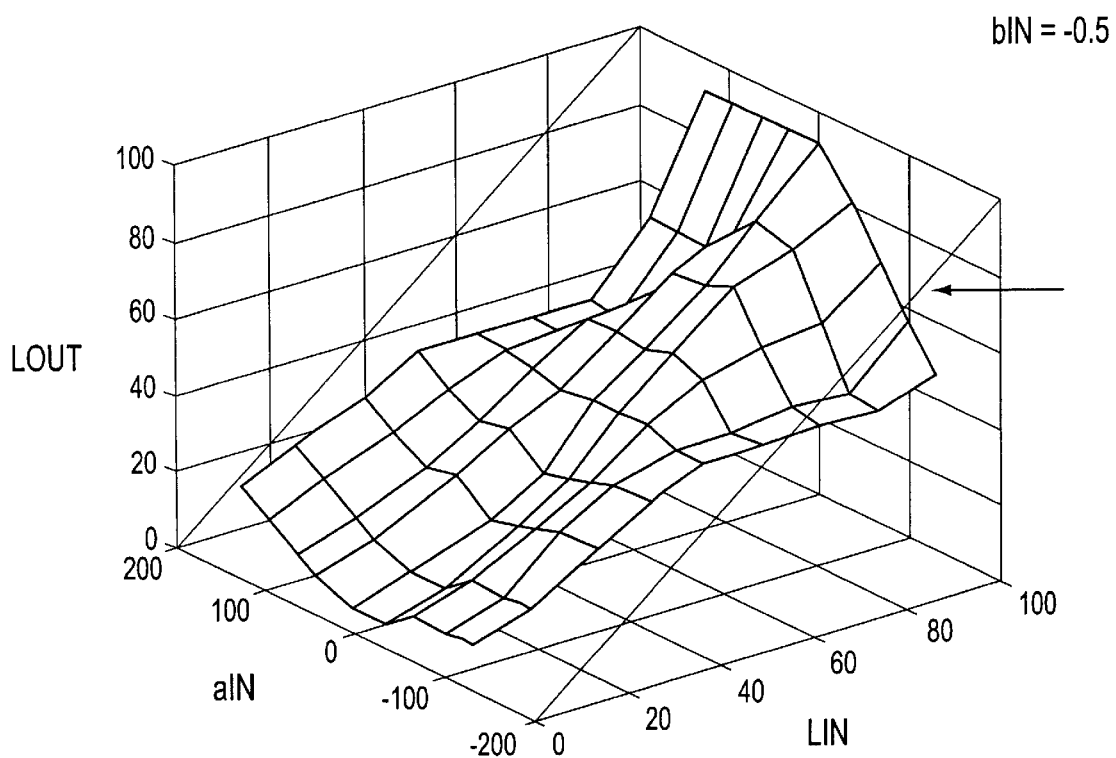
FIG. 8 is a three-dimensional plot showing output L* values for fixed input a* and input L* values with an input b* value equal to –0.5.
Figure 9:
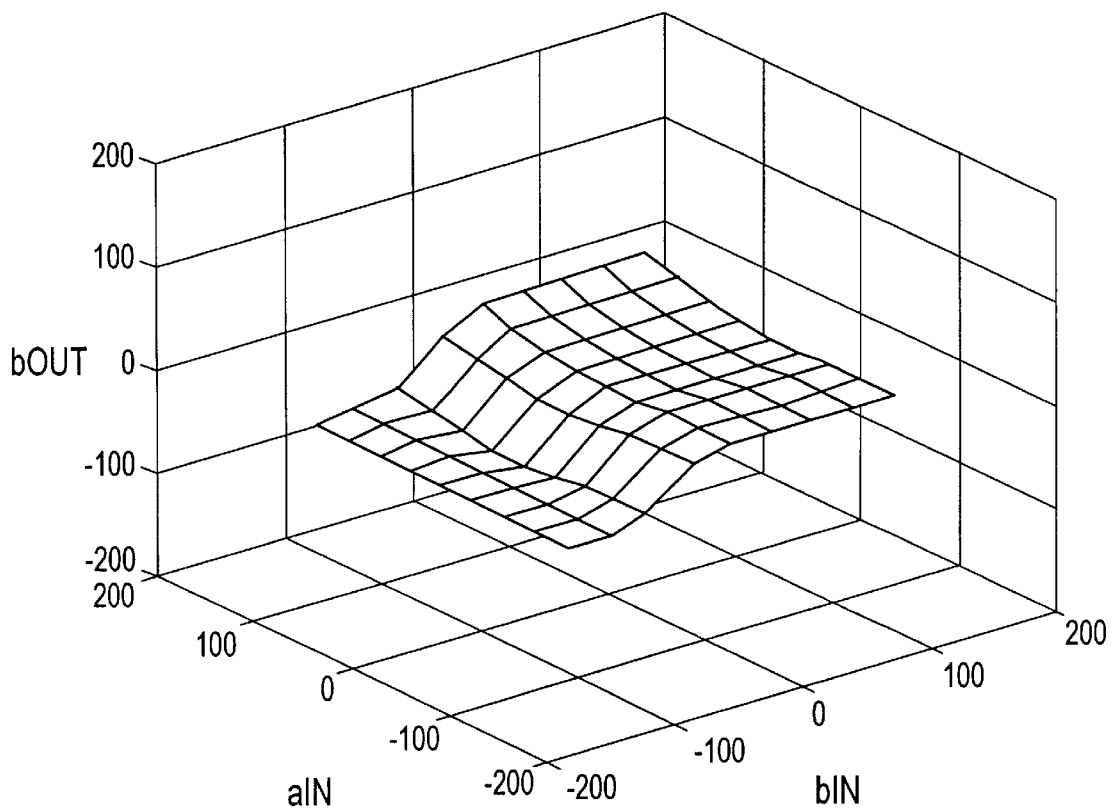
FIG. 9 is a three-dimensional plot showing output b* values for fixed input a* and input b* values with an input L* value equal to zero.
Figure 10:
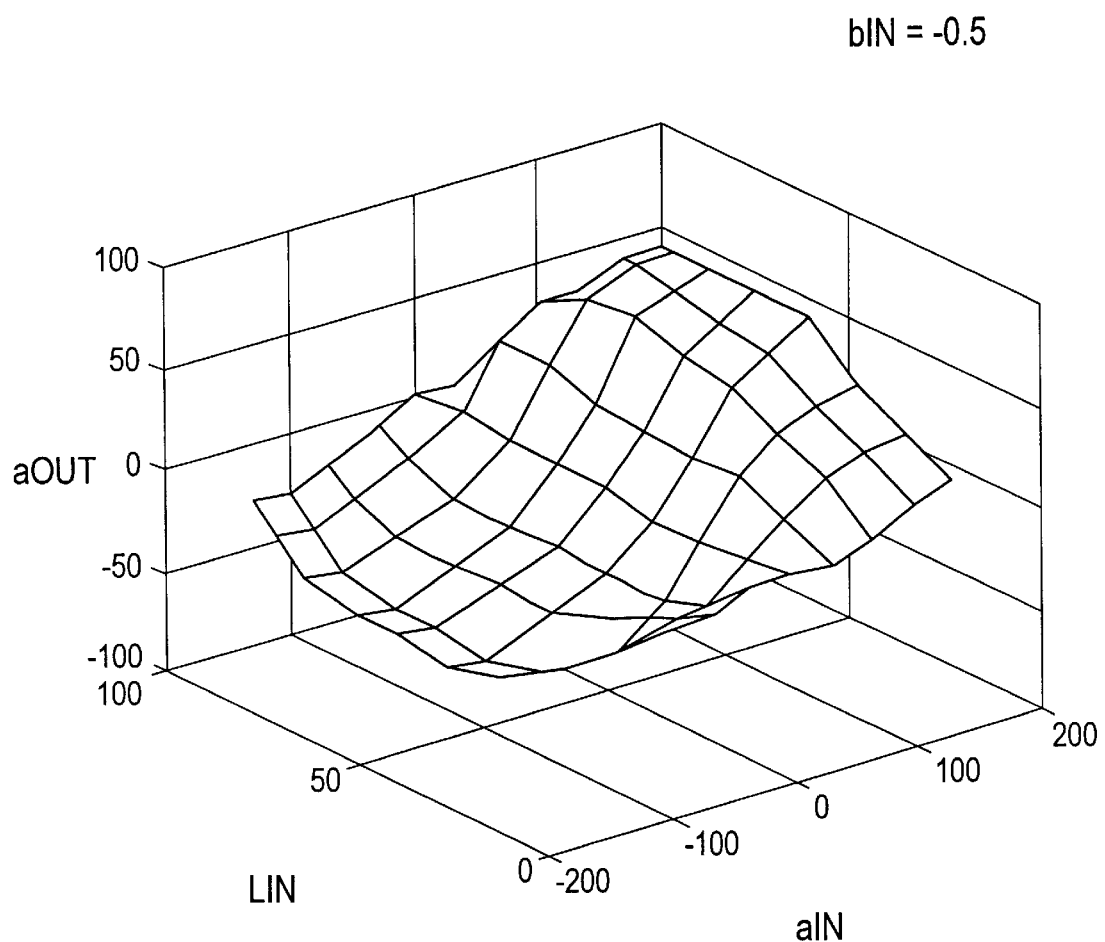
FIG. 10 is a three-dimensional plot showing output a* values for fixed input L* and input a* values with an input b* value equal to –0.5.

FIG. 8, 9 and 10 are representative samples of three dimensional plots corresponding to FIGS. 5, 6 and 7 respectively. FIG. 8 shows output L* values for fixed input a* and input L* values with an input b* value equal to −0.5. FIG. 9 shows output b* values for fixed input a* and input b* values with an input L* value equal to zero. FIG. 10 shows output a* values for fixed input L* and input a* values with an input b* value equal to −0.5. FIG. 8 shows the representative well-developed surface when the marking device output color is colorimetrically matched to the input color, all in device independent space. The surfaces that are not coplanar as shown in FIGS. 8, 9 and 10 indicate the fact that the marking device output color is not colorimetrically matched to the input color in device independent space.

The mapping algorithm look-up table 238 receives the desired image in device independent space at an input 202. The desired colors of the desired image for which output under standard conditions is not measured (i.e., the "uncontrolled colors") are mapped to the relationships between the target colors in device independent space and the target colors in drift space. Specifically, these relationships are used to determine drift space values corresponding to device independent parameter space values. The drift space values of an uncontrolled color are determined by interpolation between or extrapolation from the known values, e.g., by an interpolation method such as is disclosed in Chang, J. Z., Allebach, J. P., Bouman, C. A.; "Sequential Linear Interpolation of Multi-Dimensional Functions," IEEE Transcript on Image Processing, Vol. 6, No. 9, September. 1997.

After the desired image is mapped, a switch 235a along an output 235 is closed to allow the desired image, which is now specified in drift space, to be output to the plant 116. The desired image is then output by the marking device at an output 215. The switch 231a is left open until the next update in the look-up table 238 is requested.

The format of the mapping algorithm look-up table 238 in a preferred embodiment contains six columns. In the first three columns, the target color L*, a*, b* values in device independent space. In the second three columns, the corresponding target color L*, a*, b* values in drift space are recorded. Other equivalent representations and formats are known to those of ordinary skill in the art.

After the mapping algorithm look-up table 238 is built, it can be accessed to produce other customer images without further modification.

Figure 2B:
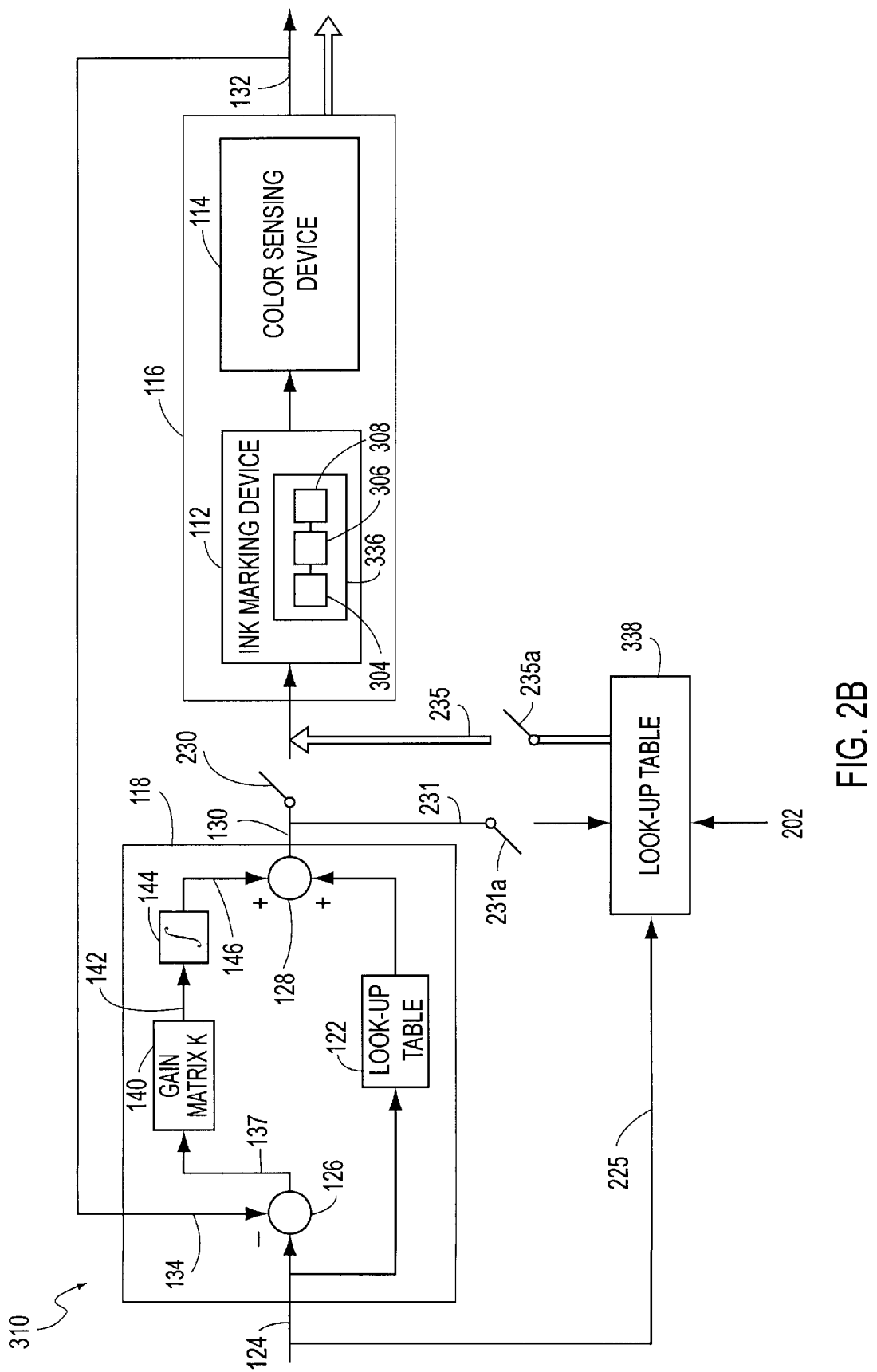
FIG. 2B is a diagram showing the structure of and functions performed by a third embodiment of a marking device with device independent image correction.

Referring to FIG. 2B, a third embodiment of a marking device system designed to achieve device independent color correction is shown. In the first and second embodiments, the calibration algorithm block 136 of the marking device 112 includes the 3-D look-up table 302 for converting the input image from device independent space to CMY space, which is a device dependent space.

In FIG. 2B, a look-up table 338 is substituted for the mapping algorithm look-up table 238 of the second embodiment. Also, a calibration block 336 in the marking device includes the UCR/GCR strategy block 304, the TRC linearization block 306 and the half-toning strategy block 308, without a 3-D look-up table. The look-up table 338 is designed to incorporate the functionality of the 3-D look-up table. The look-up table 338 maps uncontrolled colors to relationships between target colors as described above, but outputs the desired image in CMY drift space, which is a device dependent space.

The structure of the color controller of the third embodiment is the same as the color controller of the second embodiment, except that the values gain matrix K 140 are different and a look-up 222 is substituted for the look-up table 122 of the second embodiment. The look-up table 222 contains the plant inverse, as the plant 116 is viewed with the inputs and outputs as shown in FIG. 2B. The inputs to the look-up table are the device independent target colors and the outputs of the look-up table are device dependent CMY values corresponding to those target colors.

The third embodiment requires modification of the marking device, i.e., disabling or removing the 3-D look-up table in the calibration block, whereas the first and second embodiments can be used with the existing calibration algorithm blocks in conventional marking devices. The third embodiment eliminates the use of the second embodiment to provide corrections while printing device independent color across multiple marking devices.

Figure 4:
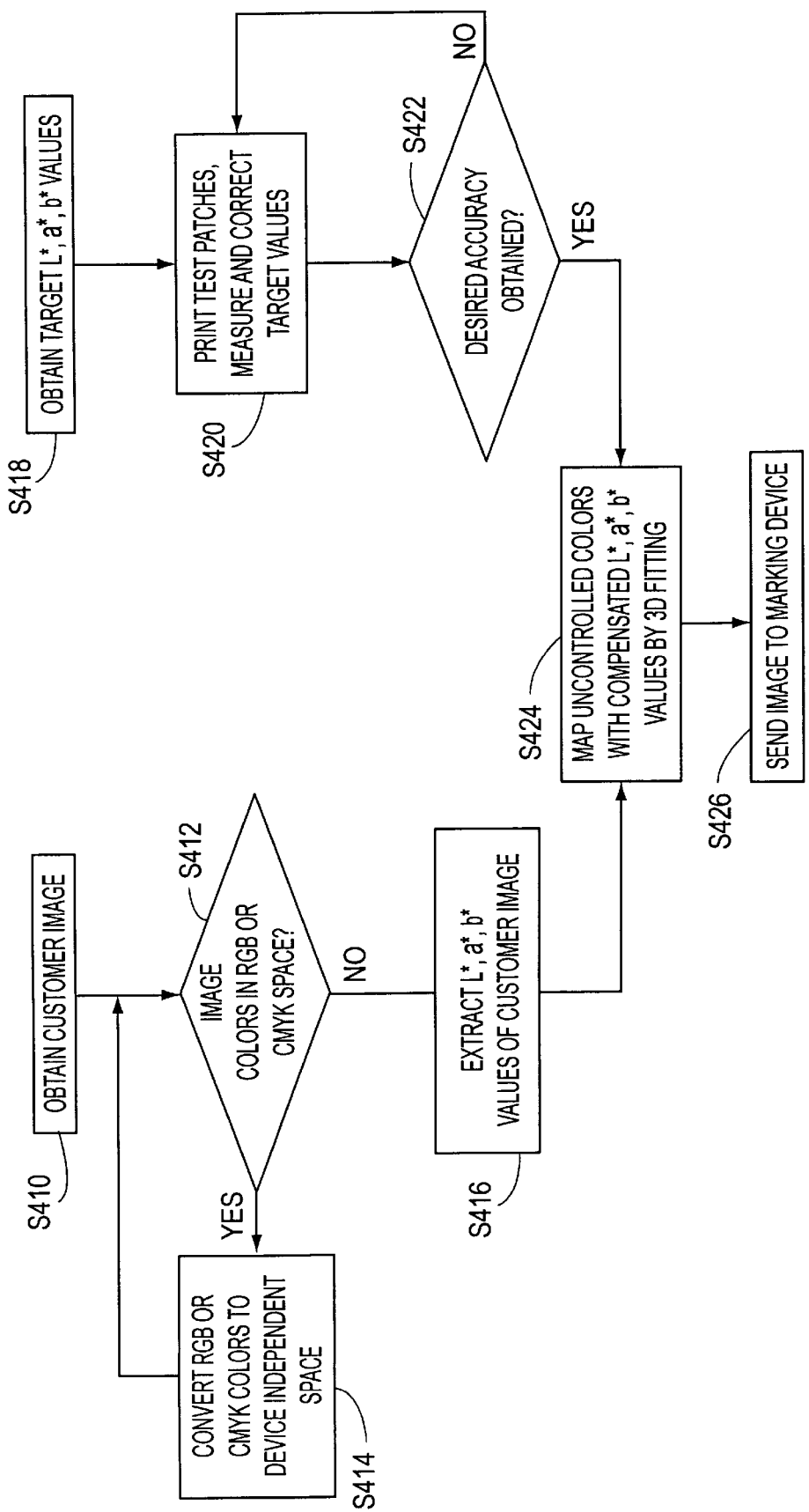
FIG. 4 is a flow chart showing steps of a method according to the invention.

FIGS. 4 is a flowchart showing the steps of a method according to the present invention. In step S410, the desired customer image is obtained. In step S412, it is determined whether the image is specified in device dependent space (e.g., in RGB or CMYK space) or in device independent space (e.g., in L*, a*, b* space).

If the image is specified in device dependent space, step S414 is performed. In step S414, the image is converted from a device dependent space to a device independent space, i.e. parameter space.

After the image is specified in parameter space, control flows to step S416. In step S416, the device independent values, e.g., the L*, a*, b* values, that specify the customer image are extracted.

In step S418, the target values specified in a corresponding device independent space, e.g., as L*, a*, b* values, under standard conditions, are obtained. These target values may be obtained from memory, e.g., from a look-up table.

In step S420, test patches of the colors specified by the target L*, a*, b* values obtained in step S418 are printed, measured and corrected as described above in connection with the operation of the color controller 118.

In step 422, it is determined whether the desired accuracy in the target L*, a*, b* values is reached. If the desired accuracy is not reached, step S420 is performed again.

When the desired accuracy has been reached, the corrected target L*, a*, b* values are determined. Thereafter, in step S424, L*, a*, b* values of all colors extracted from the customer image in step S416 are mapped into drift space by using the target colors in drift space.

In step S426, the customer image, which is now mapped to the particular characteristics of the device, is output to the marking device.

The above description of a method according to the second embodiment is the same as for a method according to the first embodiment, except that step S424 is omitted because the compensated L*, a*, b* values determined in step S420 are the values corresponding to the desired image, with compensation for marking device drift. These values are thus output to the marking device directly, without any further mapping, etc.

In the various embodiments described above, correction for drift may be triggered based on time of day, an elapsed predetermined time interval, the start of a new job, demand by a customer (i.e., at any desired time), a signal from a network of one or more interconnected marking devices (e.g., to correlate drift between two or more marking devices), or some combination thereof.

Also, the target colors under standard conditions may be output for measurement as patches in areas of the output desired image that are not used by the customer, e.g., along a top, bottom or side margin. The target colors may also be stored in a common server connected to two or more marking devices which require device independent colorimetric matching between their input and output colors.

Drift correction according to the invention can be performed at any time, at any place and with respect to a single marking device or in a coordinated fashion among two or more marking devices. As a result, drift can be corrected for marking devices used in different locations throughout the world over the interconnected network.

Although the invention has been described in connection with preferred embodiments, the invention is not limited to the disclosed embodiments. On the contrary, the application is intended to cover all alternatives, modifications and equivalents that may be included within the spirit and scope of the invention, as defined by the independent claims.

What is claimed is:

1. A method of controlling color drift between a desired image and an output image as obtained by a marking device and intended to match the desired image, comprising:

detecting a current output color in the output image with a color sensing device;

determining a difference between the current output color in the output image and a corresponding color in the desired image; and automatically setting a next output color in the output image equal to a corrected color that minimizes the difference between the next output color and the corresponding color in the output image, wherein the step of setting includes setting the corrected color equal to a sum of (A) the difference between the current output color in the output image and the corresponding color in the desired image, and (b) an output color of the marking device under standard conditions.

2. The method of claim 1, wherein the step of determining includes obtaining the output colors of the marking device under standard conditions.

3. The method of claim 2, wherein obtaining the output colors of the marking device under standard conditions includes accessing output color values stored in memory.

4. The method of claim 1, wherein the current output color is a target color under current conditions and the corresponding color in the desired image is a corresponding target color under standard conditions, and wherein the step of determining includes determining a difference between the target color under current conditions and the target color under standard conditions.

5. The method of claim 4, wherein the step of setting includes setting the next output color equal to a next target color, and wherein a difference between the next target color and the target color under standard conditions is less than a difference between the target color under current conditions and the target color under standard conditions.

6. The method of claim 1, wherein the control of the desired color occurs on a real-time basis, and setting the next output color occurs before output of the output image is completed.

7. The method of claim 1, wherein the step of determining the difference includes computing an error signal equal to a difference between the current output color in the output image expressed in parameter space and the corresponding color in the desired image expressed in parameter space.

8. The method of claim 7, wherein the step of determining includes calculating a weighted error by multiplying the error signal by a gain matrix.

9. The method of claim 8, wherein the step of determining includes calculating a color delta amount by integrating the weighted error with respect to an iteration step.

10. The method of claim 1, wherein the current output color is a target color under current conditions, and the step of detecting the current output color includes detecting the target color under current conditions with a spectrophotometer from patches of the target color on a medium as obtained by the marking device.

11. A method of controlling drift between a desired image and an output image output by a marking device and intended to match the desired image, comprising:

detecting a current output color in the output image with a color sensing device;

determining a difference between the current output color in the output image and a corresponding target color output under standard conditions; and automatically setting a next output color in the output image based on a processed difference between the current output color and the corresponding target color and processing a desired color of the desired image to minimize the difference between the next output color and the desired color in the output image.

12. The method of claim 11, wherein the control of the desired color occurs on a real-time basis, and setting a next output color occurs before output of the output image is completed.

13. The method of claim 11, wherein the current output color is a target color under current conditions and the step of determining includes obtaining the corresponding target color under standard conditions from memory.

14. The method of claim 11, wherein the step of determining includes computing an error signal equal to the difference between the current output color expressed in parameter space and the corresponding target color expressed in parameter space.

15. The method of claim 14, wherein the step of determining includes calculating a weighted error by multiplying the error by a gain matrix.

16. The method of claim 15, wherein the step of determining includes integrating the weighted error with respect to an iteration step.

17. The method of claim 16, wherein the step of setting includes summing the integrated weighted error and the processed target color under standard conditions to determine a target color in drift space.

18. The method of claim 17, wherein the step of setting includes mapping controlled and uncontrolled colors onto a relationship between target colors under current conditions and the target colors in drift space.

19. The method of claim 18, wherein the step of setting includes setting the next output color equal to a target color determined by one of interpolating between and extrapolating from known values on the relationship between the target colors under current conditions and the target colors in drift space.

20. The method of claim 17, wherein the step of setting includes mapping controlled and uncontrolled colors onto a relationship between target colors under current conditions and the target colors in a device dependent drift space.

21. A marking device drift control system that controls drift in an output image intended to match a desired image, the system comprising:

a color sensing device that senses a current output color of the output image; and a controller linked to the sensing device that determines a difference between the current output color and a corresponding target color output under standard conditions and automatically sets a next output color in the output image based on a processed difference between the current output color and the corresponding target color under standard conditions.

22. The system of claim 21, wherein the controller is linked to a memory containing target color values and the controller accesses the memory to obtain the corresponding target color under standard conditions.

23. The system of claim 22, wherein the controller includes a first summing node that determines an error signal equal to the difference between the current output color and the corresponding target color under standard conditions expressed in parameter space.

24. The system of claim 23, wherein the controller includes a multiplier containing a gain matrix and the multiplier outputs a weighted error equal to the product of the error signal and the gain matrix, and wherein the multiplier is linked to an integrator that integrates the weighted error.

25. The apparatus of claim 24, wherein the summing node is a first summing node and the controller includes a second summing node that sums the integrated weighted error and the process target colors under standard conditions to determine the target colors in drift space.

26. The apparatus of claim 25, wherein the controller is linked to a look-up table for mapping controlled and uncontrolled target colors to a relationship between the target colors under standard conditions and the target colors in drift space, and the mapped controlled and uncontrolled colors are output to the marking device in CMY space.

27. The apparatus of claim 25, wherein the controller is linked to a look-up table for mapping uncontrolled colors to a relationship between the target colors under standard conditions and the target colors in drift space.

28. The apparatus of claim 27, wherein the mapped desired colors include controlled and uncontrolled target colors that are output to the marking device.

* * * * *